United States Patent [19]

Osawa et al.

[11] Patent Number: 4,986,508
[45] Date of Patent: Jan. 22, 1991

[54] ATTACHING DEVICE FOR A DUST COVER OF A LINEAR GUIDE APPARATUS

[75] Inventors: Nobuyuki Osawa, Takasaki; Yoshinori Mizumura, Maebashi, both of Japan

[73] Assignee: Nippon Seiko Kabushiki Kaisha, Tokyo, Japan

[21] Appl. No.: 439,818

[22] Filed: Nov. 21, 1989

[30] Foreign Application Priority Data

Nov. 22, 1988 [JP] Japan .................... 63-152363
Aug. 25, 1989 [JP] Japan .................... 64-99183

[51] Int. Cl.⁵ ............................ A47F 5/00
[52] U.S. Cl. ............................ 248/300; 248/205.1; 384/15; 384/45
[58] Field of Search ............ 384/15, 45; 248/300, 248/205.1, 200, 647, 309.1

[56] References Cited

U.S. PATENT DOCUMENTS

| | | | |
|---|---|---|---|
| 1,818,814 | 8/1931 | Riggs et al. | 248/300 X |
| 4,522,246 | 6/1985 | Bierbrauer et al. | 160/223 |
| 4,566,865 | 1/1986 | Nishitsuji et al. | 248/300 X |
| 4,595,244 | 6/1986 | Teramachi | 384/15 |
| 4,676,666 | 6/1987 | Pflüger et al. | 384/15 |
| 4,867,578 | 9/1989 | Komiya | 384/15 |
| 4,886,375 | 12/1989 | Tsukada | 384/15 |

FOREIGN PATENT DOCUMENTS 6061139 9/1983 Japan .

Primary Examiner—Ramon O. Ramirez
Attorney, Agent, or Firm—Basile and Hanlon

[57] ABSTRACT

An attaching device for a bellows type dust cover of a linear guide apparatus includes a plate-shape main body and a bellows attaching plate portion integral with the plate-shape main body. The plate-shape main body has fitting plate portions which are formed by bending lower edge portions of both lateral side plate portions respectively inwardly at right angles so that both the fitting plate portions horizontally oppose each other. The fitting plate portions are respectively fitted into ball rolling grooves formed in both lateral sides of a guide rail, or into retainer relief grooves formed in groove bottoms of the ball rolling grooves. Thus, the plate-shape main body straddles an upper surface of the guide rail and sandwiches both lateral sides of the guide rail so that it is securely held to the guide rail. The bellows attaching plate portion is provided at one axial end of the plate-shape main body perpendicularly to the upper surface of the plate-shape main body. The bellows attaching plate portion has screw holes. A bellows which covers the guide rail has one end fixed to the bellows attaching plate portion by screws and the other end fixed to a slider.

7 Claims, 7 Drawing Sheets

FIG. 18
*(Prior Art)*
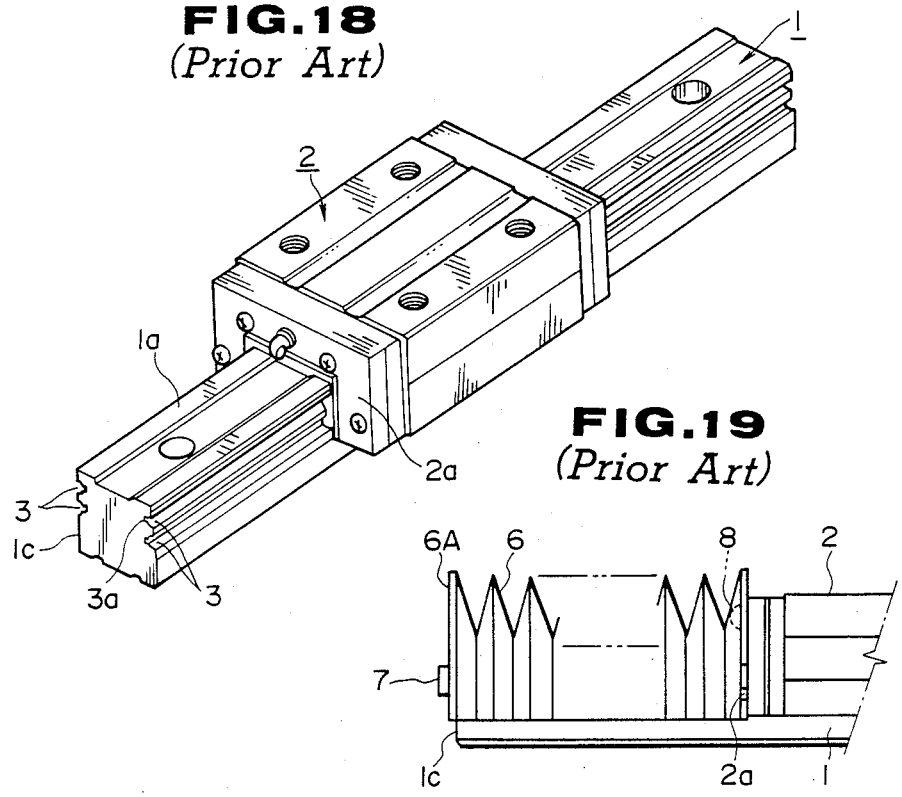
FIG. 19
*(Prior Art)*
FIG. 20
*(Prior Art)*
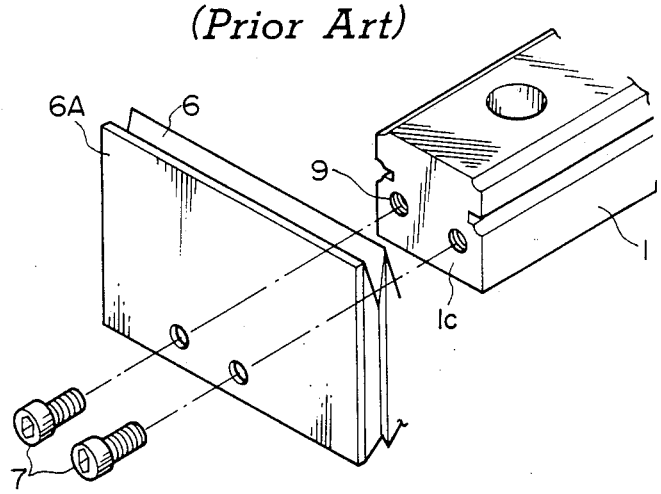

ATTACHING DEVICE FOR A DUST COVER OF A LINEAR GUIDE APPARATUS

BACKGROUND OF THE INVENTION

Field of the Invention

The present invention relates to a linear guide apparatus, and in particular, to an attaching device for an expandable bellows type dust cover which is mounted on a guide rail for preventing foreign particles, such as cutting chips or cutting oil, from depositing on a surface of the guide rail of a linear guide apparatus.

As shown in FIG. 18, a guide rail 1 of a linear guide apparatus has axial ball rolling grooves 3 formed in both lateral side surfaces. A slider 2 is straddlingly mounted on the guide rail 1 which has a continuous length. The slider 2 has ball rolling grooves (not shown) respectively opposing the ball rolling grooves of the guide rail 1. A plurality of balls are rollable inserted in the opposing ball rolling grooves.

These balls circulate through circulating routes formed in the slider 2 when the slider 2 moves on the guide rail 1 in the axial direction. When the slider 2 is removed from the guide rail 1, the balls are held within the ball rolling grooves in the slider 2 by a ball retainer. When the slider 2 is mounted on the guide rail 1, the ball retainer is accommodated in a retainer relief groove 3a formed in a groove bottom portion of the ball rolling groove 3 so that the ball retainer does not disturb the circulation of the balls.

The guide rail 1 is secured to a base of, for example, a machine tool, robot, measuring equipment, precision positioning table, etc., by a bolt. On the other hand, a member to be driven, such as a cutter table in the case of the machine tool, is screwed to the slider 2. With the movement of the slider 2, the member to be driven is linearly moved along the guide rail 1.

When an accurate linear movement is required especially, if foreign particles, such as dust, weld powder, cutting oil, or the like, are deposited on the upper surface 1a, or the ball rolling grooves of the guide rail 1, and if these foreign particles enter the inside of the slider 2, smooth rolling of the balls will be disturbed and the desired accuracy will not be insured. Furthermore, in a linear guide apparatus in which a dust seal made of rubber is attached to an end of the slider 2, the sliding movement of the slider becomes heavy, and the dust sealing has not been perfect.

Accordingly, in order to prevent deposition of foreign particles and to reduce a movement resistance, it has been carried out to cover the guide rail of the linear guide apparatus with a dust cover.

Dust covers of this type known in the art include, for example, a bellows 6 as shown in FIGS. 19 and 20. In attaching the bellows 6 to the guide rail 1, an attaching plate 6A is secured at one longitudinal end of the bellows 6 to an end face 1c of the guide rail 1 with bolts 7, and the other end of the bellows 6 is secured to an end face 2a of the slider 2 with screws 8. To this purpose, screw holes 9 are formed in the guide rail.

Accordingly, in the case of attaching the bellows type dust cover of the linear guide apparatus, it is necessary to form the screw holes (tapped holes) 9 in the end face 1c of the guide rail 1. However, guide rails are usually manufactured to have a long, standard, continuous length, and they are cut to a desired length in accordance with a user's request. As a result, problems are encountered in that it is not easy to work the tapped holes in the end face of the guide rail of a continuous length, it takes a lot of time to perform such work, and it hinders a reduction in product cost and delivery time.

SUMMARY OF THE INVENTION

The present invention was made in view of the problems in the prior art, and it is an object of the invention to provide an attaching device for a dust cover of a linear guide apparatus which can be attached without machining tapped holes in the end face of the guide rail, especially, to realize a reduction in product cost and delivery time of the linear guide apparatus.

An attaching device in the present invention is used for a dust cover mounted to an end face of a guide rail of a linear guide rail, wherein the linear guide apparatus includes the guide rail having axial rolling member rolling grooves formed in both lateral side surfaces, a slider mounted movably and straddlingly on the guide rail and having rolling member rolling grooves respectively opposing the rolling member rolling grooves of the guide rail, and a plurality of rolling members fitted into opposing ones of the ball rolling grooves of the guide rail and the slider. The attaching device for the dust cover which includes a bellows having one end fixed to the slide and the other end fixed to the attaching device comprises a plate-shaped main body having an upper plate portion, lateral side plate portions, and fitting plate portions formed by bending lower end portions of both the lateral side plate portions inwardly so that the plate-shaped main body straddles an upper surface of the guide rail and sandwiches the guide rail at both lateral sides thereof, and a bellows fixing plate portion provided at one axial end of the plate-shaped main body perpendicularly to an upper surface of the plate-shaped main body.

The fitting plate portions of the lateral side plate portions may be formed so that they are respectively fitted into retainer relief grooves provided in the grooved bottoms of the rolling member rolling grooves of the guide rail.

The fitting portions may be formed to respectively have rolled edges curved by curling or rolling the inner edge portions of the fitting plate portions so that the rolled edge portions engage the rolling member rolling grooves of the guide rail.

Furthermore, the fitting plate portions may be curved slightly along the longitudinal direction to provide an interference with respect to the retainer relief grooves.

Alternately, the fitting plate portions may be formed with projections to provide an interference with respect to the retainer relief grooves.

Furthermore, the upper plate portion of the plate-shaped main body may be cut substantially in a U-shape and formed as a pressing portion by bending the cut U-shaped portion so as to elastically press the upper surface of the guide rail.

In addition, projections may be formed on a lower surface of the plate shaped main body to press the upper surface of the guide rail and to bring the plate shaped main body into close contact with (he guide rail.

The attaching device for the dust cover in the present invention can he mounted in a single operation by axially fitting about the guide rail from an end. In this case, the fitting plate portions of the attaching device are made to engage the side surface of the guide rail, or the rolling member rolling grooves in the side surfaces of the guide rail, or the retainer relief grooves provided in the groove bottoms of the rolling member rolling grooves, so that the attaching device is fixed to the guide rail by securely holding the guide rail.

As a result, there is no need to work the screw holes for attaching the dust cover in the end face of the guide rail, and a reduction in the manufacturing cost and the delivery time can be achieved.

In the type of the attaching device in which the fitting plate portions are made to engage the retainer relief grooves formed in the groove bottoms of the rolling member rolling grooves, by curving the fitting plate portions slightly in the longitudinal direction, or by forming projections on the fitting plate portions, the interference is provided with respect to the retainer relief grooves, and the attaching device for the dust cover can be rigidly fastened.

In the type of the attaching device in which the extreme inner edges of the fitting plate portions are curled up or rolled, the rolled surfaces of the fitting plate portions can be made to closely contact the curved surfaces of the rolling member rolling grooves. As a result, it is possible to rigidly mount the attaching device on the guide rail without utilizing the retainer relief grooves formed in the groove bottoms of the rolling member rolling grooves. This provides an advantage of permitting the use of a guide rail which has no retainer relief grooves formed in the groove bottoms of the rolling member rolling grooves.

In either of the above types, by cutting and forming a cut in a U shape in the upper plate portion of the plate-shaped main body and bending the cut U-shaped portion downwardly to form a pressing portion against the upper surface of the guide rail, or by forming projections on the lower surface of the upper plate portion of the plate-shaped main body to press the upper surface of the guide rail, it is possible to enhance the contact between the dust cover attaching device and the guide rail so as to improve the stability of the attachment of the dust cover attaching device.

Since the pressing portion formed in the upper plate portion of the attaching device is bent downwardly and slantingly traversing the guide rail, the rear edge of the pressing portion slides on the upper surface of the guide rail in a direction of fitting the attaching device about the guide rail such that the attaching device for the dust cover can be easily mounted thereto. On the other hand, the rear edge of the attaching device is apt to be caught by the upper surface of the guide rail in a direction of drawing the attaching device out of the guide rail.

BRIEF DESCRIPTION OF THE DRAWINGS

FIG. 1 is a side view of the first embodiment of the present invention;

FIG. 18 is a perspective view of a prior art linear guide apparatus;

FIG. 19 is a side view illustrating a condition in which a dust cover is attached to a prior art attaching device; and FIG. 20 is a perspective view of a disassembled bellows and attaching plate shown in FIG. 19.

DESCRIPTION OF THE PREFERRED EMBODIMENTS

Figure 1:
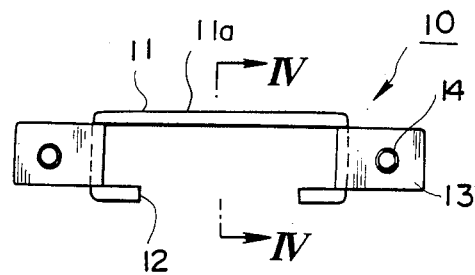
FIG. 1 is a front view of a first embodiment of the present invention.
Figure 2:
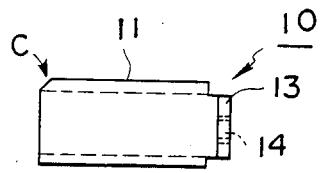
Figure 3:
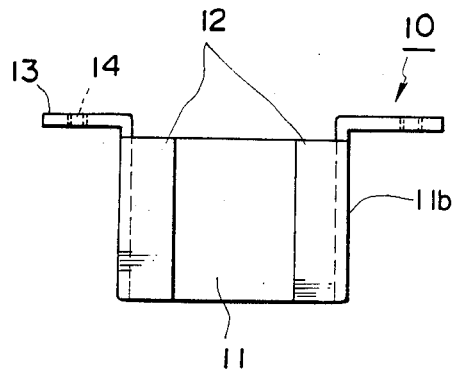
FIG. 3 is a bottom view of the first embodiment of the present invention.

The embodiments of the present inveniion will be described with reference to the drawings in which identical or equivalent parts are designated by identical reference numerals.

FIGS. 1 to 6 show a first embodiment of an attaching device for a dust cover. The attaching device 10 includes a plate-shaped main body 11 which is formed to straddle an upper surface 1a of a guide rail 1. The plate-shaped main body 11 has an upper plate portion 11a and two lateral side plate portions 11b opposing each other. The lower edge portions of the lateral side plate portions 11b are bent inwardly at substantially right angles to form fitting plate portions 12 which sandwich and hold the guide rail 1. Furthermore, each of the lateral side plate portions 11b extends axially from one axial end thereof, and the extended portion is bent outwardly at right angles to thereby form a bellows attaching plate portion 13. Thus, both the bellows attaching plate portions 13 extend laterally and outwardly from one axial end of the lateral side plate portions 11b. Screw holes 14 are formed in the bellows attaching plate portions 13 to secure one end of a bellows which covers the guide rail thereto. The other end of the bellows is secured to a slider.

The attaching device 10 for a dust cover is manufactured by a plate work, and a thin rectangular plate material having a thickness slightly smaller than a groove width of a retainer relief groove 3a is bent and stamped to form the attaching device 10. Accordingly, the size of the fitting plate portions 12 is selected to be engageable with the retainer relief grooves 3a when the attaching device 10 is mounted on the guide rail 1.

Figure 4:
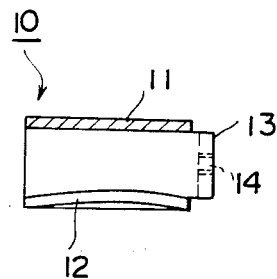
FIG. 4 is a sectional view taken along line IV—IV in FIG. 1.

The fitting plate portions 12 in this embodiment, as shown in FIG. 4, are bend slightly upwardly in a longitudinal direction. As a result, an interference is elastically provided when the fitting plate portions 12 are respectively fitted into the retainer relief grooves 3a.

Figure 5:
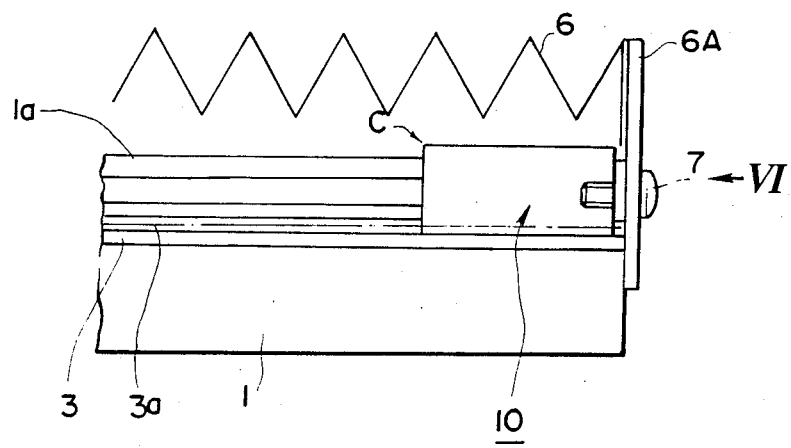
FIG. 5 is a side view illustrating a condition of attaching a dust cover to the attaching device of FIG. 1.

Furthermore, the end faces of the lateral side plate portions 11b opposite to the bellows attaching plate portions 13 of the plate-shaped main body 11 are chamfered as shown in C, FIG. 5. This chamfered portion C prevents an inner surface of the bellows 6 of the dust cover from being caught and damaged when the bellows 6 passes through the end faces of the lateral side plate portions 11b.

Next, the assembly operation and use of the device of the present invention will be described.

In attaching the bellows 6 of the dust cover, first, the attaching device 10 for the dust cover is fixed to an end of the guide rail 1. This fixing is performed in a single operation by inserting the fitting plate portions 12 of the attaching device 10 forcibly into the retainer relief grooves 3a of the guide rail 1. Since the fitting plate portions 12 have a curved structure, the attaching device 10 is rigidly secured to the retainer relief grooves 3a of the guide rail 1 and prevented from slipping out therefrom.

Figure 6:
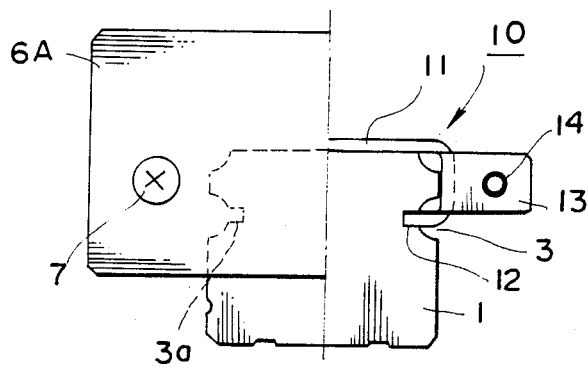
FIG. 6 is a view in a direction of arrow VI in FIG. 5 (a right hand half part of the bellows being omitted)
Figure 7:
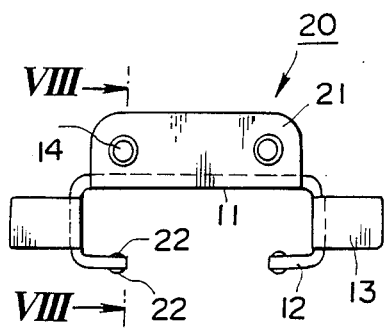
FIG. 7 is a front view of a second embodiment of the present invention.
Figure 8:
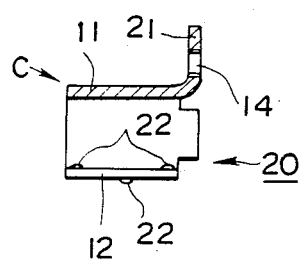
FIG. 8 is a sectional view taken along line VIII—VIII in FIG. 7.
Figure 9:
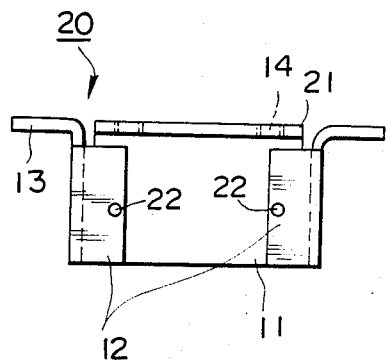
FIG. 9 is a bottom view of the second embodiment of the present invention.
Figure 10:
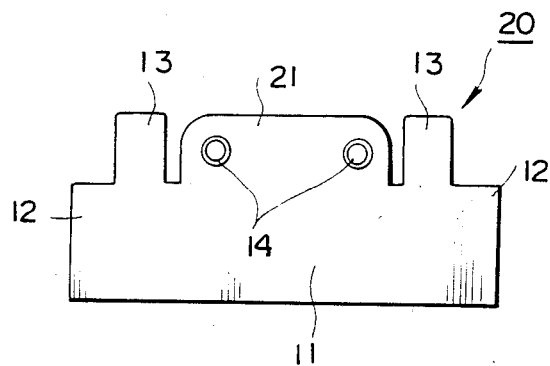
FIG. 10 is a development view of the second embodiment of the present invention.
Figure 11:
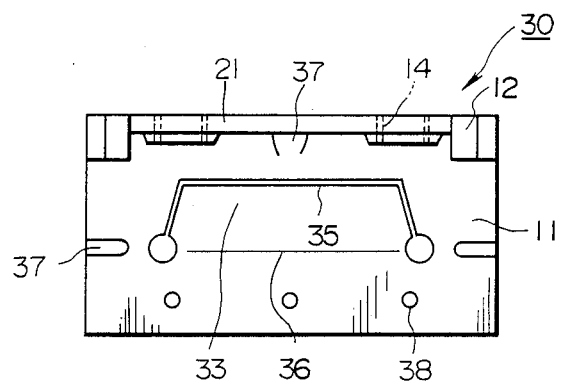
FIG. 11 is a plan view of a third embodiment of the present invention.
Figure 12:
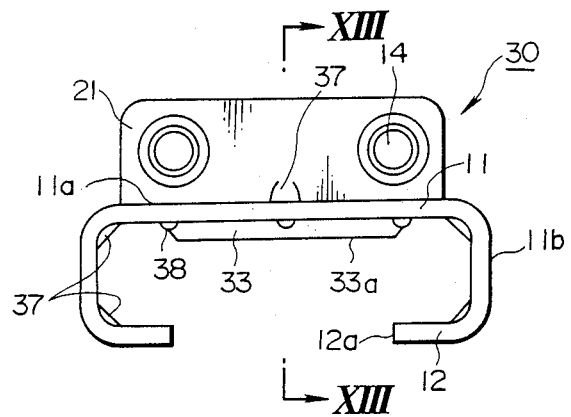
FIG. 12 is a front view of the third embodiment of the present invention.
Figure 13:
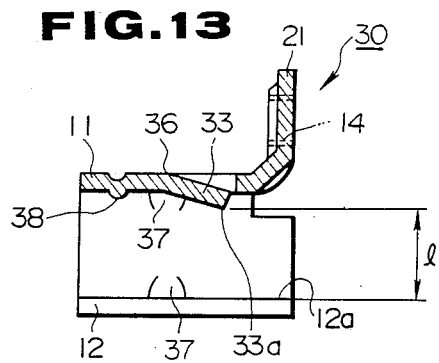
FIG. 13 is a sectional view taken along line XIII—XIII in FIG. 12.

After the attaching device 10 is secured to the guide rail 1, a fixing plate 6A which is a part of the bellows 6 and connected at an end of the bellows 6 of the dust cover is applied to the bellows attaching plate portions 13 of the dust cover attaching device 10, and screws 7 are screwed into the screw holes 14 and pass through openings formed in the bellows 6. In this manner, one end of the bellows 6 which covers the upper surface 1a and the ball rolling grooves 3 at both the lateral sides of the guide rail 1 is secured to the guide rail 1 through the dust cover attaching device 10 as shown in FIGS. 5 and 6.

The other end of the bellows 6 is secured to an end face of the slider 2 in a similar manner as in the prior art. Likewise, an opposite end of the guide rail 1 is secured with a bellows 6 through an attaching device 1- for a dust cover.

With the movement of the slider 2 on the guide rail 1, the two bellows 6 at opposite ends of the slider 2 expand and contract, respectively, to follow the movement of the guide rail 1.

In this embodiment, there is no need to work the screw holes in the end face 1c of the guide rail 1 for attaching the dust cover and, therefore, the manufacturing cost and the delivery time of the guide rail 1 can be reduced. Furthermore, although the guide rail 1 is usually used by cutting it to a suitable length, the dust cover can be instantly attached even when the guide rail 1 is cut at any position.

FIGS. 7 to 10 show a second embodiment of the present invention.

The second embodiment differs from the first embodiment in the manner of forming an attaching plate portion 20 having screw holes 14 for a dust cover in which one axial end of an upper plate portion of a plate-shaped main body 11 is axially extended and the extended portion is bent upwardly at right angles to form the attaching plate portion 20. The second embodiment further differs from the first embodiment in that a plurality of projections 22 are formed on fitting surfaces of fitting plate portions 12 so that the fitting plate portions 12 are rigidly fitted into retainer relief grooves 3a.

In this case, the bellows attaching plate portions 13 formed in the first embodiment by axially extending the axial ends or ridges of both the lateral side plate portions 11b and by bending the extended portions outwardly and laterally are retained in place without forming the screw holes 14 for use as supports for the bellows fixing plate 6A.

The advantage in the second embodiment is as follows. In the first embodiment, in order to insure a correct interval (pitch) between the screw holes 14, it is required to form the screw holes 14 after the bellows attaching plate portions 13 have been formed by bending. In contrast, in the second embodiment, as shown in a development view in FIG. 10, the screw holes 14 are formed by stamping at the time of forming the external shape of the plate-shaped main body 11. As a result, the number of processes is reduced and it can be manufactured inexpensively.

The other advantages of the second embodiment are the same as the first embodiment.

FIGS. 11 to 15 show a third embodiment of the present invention.

A plate-shaped main body 11 of an attaching device 30 for a dust cover in this embodiment also has both lateral side plate portions 11b formed to straddle an upper surface 1a of the guide rail 1, and lower edge portions of the lateral side plate portions 11b are bent inwardly at about right angles to form fitting plate portions 12 which are fitted into retainer relief grooves 3a of the rolling member rolling grooves 3 of the guide rail 1. On the other hand, a bellow attaching plate portion 21 is formed, as in the second embodiment, by extending an axial edge of an upper plate portion 11a of the plate-shaped main body 11 in the axial direction, and by bending the extended portion upwardly at right angles such that it exiends vertically.

Furthermore, in this embodiment, a pressing portion 33 is provided to elastically press the upper surface 1a of the guide rail 1 in cooperation with the fitting plate portions 12 to thereby rigidly hold the guide rail 1 at three positions. The pressing portion 33 is formed by making a cut 35 in a U-shape in the upper plate portion 11a of the plate-shaped main body 11. Then a base portion 36 of the cut U-shaped portion is bent slightly downwardly to thereby form a tongue-shaped portion protruding downwardly and slantingly. Furthermore, when the fitting plate portions 12 are engaged with the rolling member rolling grooves 3 of the guide rail 1, in order that a rear edge 33a of the protruded tongue portion can strongly and elastically press against the upper surface 1a of the guide rail 1 due to the elasticity of the bent base portion 36, a size 1 of an interval between the rear edge 33a and an inward edge 12a of the fitting plate portion 12 is suitably adjusted. By changing the size 1, it is possible to adjust the degree of clamping at the time of holding the guide rail 1 by the attaching device 30 for the dust cover.

The bellows attaching plate portion 21 has screw holes 14 for attaching the bellows. Accordingly, in order that fixing screws are reliably and securely threaded into the screw holes 14 even when the bellows attaching plate portion 21 is made of a sheet, the screw holes 14 are formed after the bellows attaching plate portion 21 is subjected to an expansion work so that the edge of each screw hole 14 protrudes cylindrically.

Furthermore, ribs 37 are formed at inner bent portions of the lateral side plate portions 11b and the fitting plate portions 12 of the plate-shaped main body 11 in order to enhance the rigidity of the main body 11.

Moreover, a plurality of spaced projections 38 (three in FIGS. 11 and 12) are formed in a width direction on the lower surface of the upper plate portion 11a of the plate-shaped main body 11. These projections 38 prevent looseness from existing when the attaching device 30 for the dust cover is mounted on the guide rail 1.

In place of the projections 38, or together with the projections 38, the fitting plate portions 12 may be curved slightly upwardly in the longitudinal direction as in the first embodiment. This structure provides an elastic interference when the fitting plate portions 12 are fitted into the rolling member rolling grooves 3, or the retainer relief grooves 3a.

Figure 14:
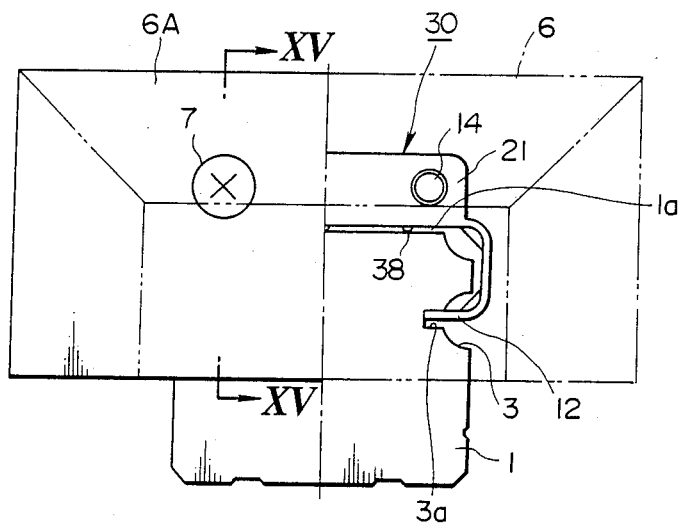
FIG. 14 is a front view illustrating a condition in which a dust cover is attached to the attaching device shown in FIGS. 11 to 13 (a right hand half part of a bellows being omitted)
Figure 15:
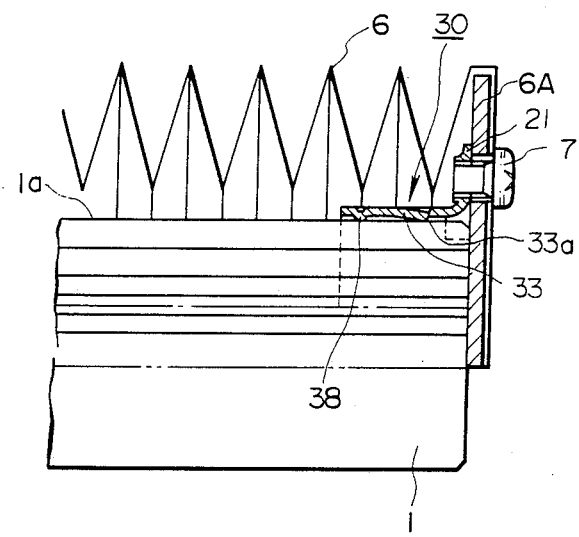
FIG. 15 is a sectional view taken along line XV—XV in FIG. 14.

FIGS. 14 and 15 show a condition in which the attaching device 30 for the dust cover in the third embodiment is mounted on the guide rail 1, and a bellows 6 is attached to the attaching device 30.

In mounting the attaching device 30 on the guide rail 1, the fitting plate portions 12 are fitted into the retainer relief grooves 3a of the rolling member rolling grooves 3, and the attaching device 30 is fitted about the guide rail 1 by forcibly pushing the attaching device 30 onto the guide rail 1. In this case, the rear edge 33a of the pressing portion 33 slides on the upper surface 1a of the guide rail 1 to permit easy mounting of the attaching device 30. On the other hand, when the attaching device 30 is moved in a direction for demounting, the rear edge 33a of the pressing portion 33 tends to be held or caught by the upper surface 1a of the guide rail 1 and, thus, any slipping of the attaching device 30 out of the guide rail 1 is prevented.

Accordingly, the attaching device 30 holds the guide rail 1 at both sides thereof by the fitting plate portions 12 which are fitted into the retainer relief grooves 3a of the rolling member rolling grooves 3 and, at the same time, presses elastically against the upper surface 1a of the guide rail 1 by the pressing portion 33. As a result, the attaching device 30 holds the guide rail 1 at three positions so that the attaching device 30 is rigidly secured to the guide rail 1.

Figure 16:
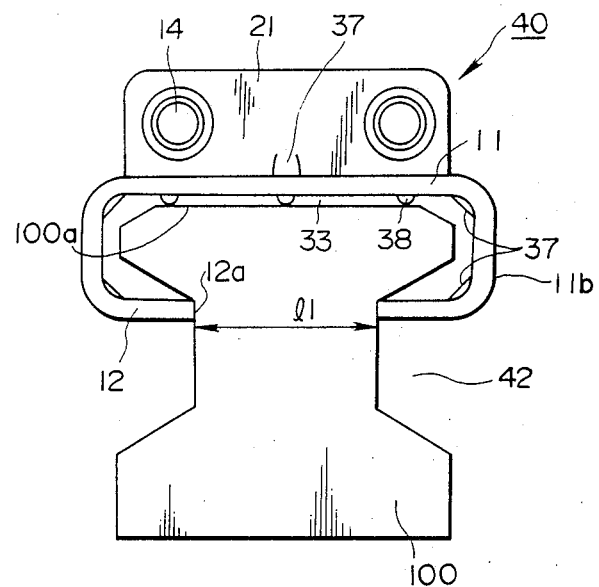
FIG. 16 is a front view of a fourth embodiment of the present invention (mounted on a guide rail)

FIG. 16 shows a fourth embodiment of the present invention.

In an attaching device 40 for a dust cover in this embodiment, an interval 11 between opposing inward edges 12a of the fitting plate portions 12 is formed narrower than a corresponding interval in the third embodIment. In other points, the fourth embodiment is the same as the third embodiment. However, a guide rail 100, in this case, has an I-shaped cross section as shown in FIG. 16. A recess 42 which is formed in each of the lateral sides has no retainer relief groove. Also in this case, the fitting plate portions 12 sandwich the lateral sides of the guide rail 100, and the pressing portion 33 presses elastically against an upper surface 100a so that the guide rail 100 is rigidly held by the attaching device 40 at three positions.

Figure 17:
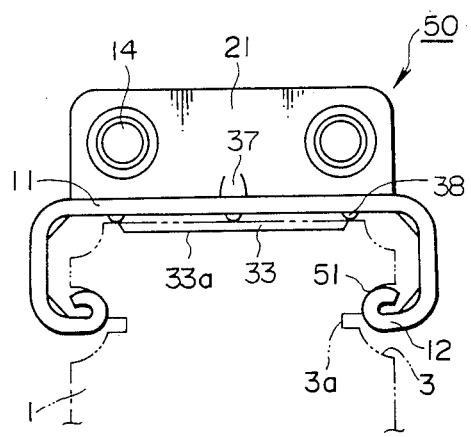
FIG. 17 is a front view of a fifth embodiment of the present invention.

FIG. 17 shows a fifth embodiment of the present invention.

In an attaching device 50 for a dust cover in this embodiment, the inner edges of the fitting plate portions 12 which are formed by bending lower portions of the lateral side plate portions of a plate-shaped main body 11 are further curled or rolled to form rolled fitting portions 51 so that the rolled fitting portions 51 are fitted into rolling member rolling grooves 3 (in this case, a guide rail has retainer relief grooves 3a) of the guide rail 1. The outer semicylindrical surfaces of the rolled fitting portions 51 are brought into close contact with the curved surfaces of the rolling member rolling grooves 3 at both lateral sides of the guide rail 1. As a result, an advantage is provided in which independent of whether the rolling member rolling grooves 3 have the retainer relief grooves 3a or not, the attaching device 50 can be mounted securely on the guide rail 1. The other structure is the same as the third and fourth embodiments.

In each of the above embodiments, although the screw holes 14 are formed in the bellows attaching plate portion 13 or 21 and the bellows 6 is fixed by the screws 14, when the bellows 6 is fixed by riveting, rivet holes are formed in place of the screw holes. Further, when the bellows 6 is fixed to the bellows attaching plate portion 13 or 21 by welding, the above-mentioned screw holes and rivet holes are not necessary.

As described in the foregoing, in the present invention, an attaching device for a dust cover at least comprises a plate-shaped main body having fitting plate portions formed by bending lower portions of both lateral side plate portions inwardly so that the plate-shaped main body straddles an upper surface of a guide rail and sandwiches lateral sides of the guide rail. The attaching device further comprises a bellows attaching plate portion provided at one axial end of the plate-shaped main body perpendicularly to an upper surface of the plate-shaped main body so that a bellows which covers the guide rail is fixed at the other end thereof to the bellow attaching plate portion.

As a result, an advantage is provided in that the work which has been required in the prior art for forming the screw holes in an end face of the guide rail for attaching a bellows is not necessary, and thus, a reduction in the manufacturing cost and the delivery time of the guide rail can be realized.

Moreover, there is no need for post-working the screw holes for fixing a bellows to a guide rail which is cut to any length and independent of whether the guide rail has retainer relief grooves or not. Further, the attaching device for the dust cover can be mounted in a single operation almost instantly so that the linear guide is very easy to use.

What is claimed is:

1. An attaching device for a dust cover mounted on an end of a guide rail of a linear guide apparatus, wherein said linear guide apparatus includes the guide rail having axial rolling member rolling grooves in both lateral sides, a slider loosely and movably fitted about said guide rail and having rolling member rolling grooves respectively opposing rolling member rolling grooves of said guide rail, and a plurality of rolling members rollably fitted in the opposing rolling member rolling grooves, and wherein said dust cover includes a bellows which covers said guide rail and has one end fixed to said slider and the other end fixed to said attaching device, said attaching device comprising;

a plate-shaped main body having fitting plate portions formed by bending both lateral side plate portions of said plate-shaped main body inwardly so that said plate-shaped main body straddles an upper surface of said guide rail and sandwiches both lateral sides of said guide rail; and a bellows attaching plate portion provided at one axial end of said plate-shaped main body perpendicularly to an upper surface of said plate-shaped main body.

2. The attaching device according to claim 1, wherein said fitting plate portions are formed to be fitted into a retainer relief grooves respectively formed in the groove bottoms of said rolling member rolling grooves of said guide rail.

3. The attaching device according to claim 1, wherein said fitting plate portions respectively have rolled edge portions at extreme inner ends thereof, said rolled edge portions being respectively fitted into said rolling member rolling grooves of said guide rail.

4. The attaching device according to claim 2, wherein said fitting plate portions are respectively curved in a longitudinal direction to provide an interference in fitting the fitting plate portions into said retainer relief grooves.

5. The attaching device according to claim 2, wherein said fitting plate portions respectively have projections formed thereon to provide an interference in fitting the fitting plate portions into said retainer relief grooves.

6. The attaching device according to claim 1 wherein said plate-shaped main body has a pressing plate portion formed by cutting an upper plate portion in a U-shape and by bending the cut U-shaped plate portion downwardly so that said pressing plate portion elastically presses against the upper surface of said guide rail.

7. The attaching device according to claim 1 wherein said plate-shaped main body has projections formed on a lower surface of an upper plate portion to press against the upper surface of said guide rail by said projections.

* * * * *